United States Patent [19]

Jayne

[11] Patent Number: 4,867,497
[45] Date of Patent: Sep. 19, 1989

[54] LOAD SUPPORTING RACK FOR ATTACHMENT TO PICK-UP TRUCK BOX

[76] Inventor: Gilbert Jayne, R.R. #3, Campbellville, Ontario, Canada, L0P 1B0

[21] Appl. No.: 198,523

[22] Filed: May 26, 1988

[51] Int. Cl.⁴ ............................................. B60P 3/00
[52] U.S. Cl. ................................... 296/3; 224/42.45 R
[58] Field of Search .................... 296/3, 50, 146, 95.1; 211/182; 224/42.42, 42.45 R; 280/756

[56] References Cited

U.S. PATENT DOCUMENTS

| | | | |
|---|---|---|---|
| 3,765,713 | 10/1973 | Suitt | 296/3 |
| 3,891,262 | 6/1975 | Brunel | 296/3 |
| 4,199,186 | 4/1980 | Faverino | 296/50 |
| 4,389,067 | 6/1983 | Rubio | 296/50 |
| 4,398,763 | 8/1983 | Louw | 296/3 |
| 4,405,170 | 9/1983 | Raya | 296/3 X |
| 4,565,402 | 1/1986 | Hopkins | 296/3 |
| 4,604,013 | 8/1986 | Elwell et al. | 296/41 X |
| 4,611,824 | 9/1986 | McIntosh | 296/3 X |
| 4,659,131 | 4/1987 | Flournoy et al. | 296/3 |
| 4,752,097 | 6/1988 | Van Kirt et al. | 296/39.2 |
| 4,770,458 | 9/1988 | Burke et al. | 296/3 |

Primary Examiner—Dennis H. Pedder
Assistant Examiner—Joseph D. Pape
Attorney, Agent, or Firm—Rogers & Scott

[57] ABSTRACT

A rack has a lower longitudinal truss which in use rests on an upright panel defining a forward part of the box of a pickup truck. A pair of upstanding members connect the lower truss to an upper truss which is parallel to the lower truss and spaced to elevate a load above the cab roof. The upstanding members are inwardly spaced from the ends of the lower truss and the ends of the upper truss are flush with the upstanding members so that a load will be centered in the truck box. A window guard is provided between the upper and lower trusses and is made of flat bar oriented so as to maximize visibility through the rear window of the cab.

4 Claims, 2 Drawing Sheets

LOAD SUPPORTING RACK FOR ATTACHMENT TO PICK-UP TRUCK BOX

This invention relates to a rack for attaching to the box of a pick-up truck and for use in supporting or securing loads being transported in the truck.

Pick-up trucks are very popular vehicles and in part, this popularity is due to their load carying capacity and compact size, together with other factors such as manoeuvrability, fuel economy and versatility. Unfortunately, the load carrying capacity is limited to some extent, by the size and configuration of the box which generally is of open construction. To transport a long ladder or other long load such as pipe or timber in a pick-up truck can be very cumbersome. Road safety rules limit the extent to which a load is permitted to extend beyond the ends of a vehicle. To attach the load to the side of the truck or to its roof may be damaging to the paintwork unless elaborate precautions are taken to protect it. Some permanent or semi-permanent fixtures have been used but these tend to be bulky and awkward to use.

Another disadvantage is that pick-up trucks are not generally equipped with anchor points to secure and restrain loads. In some cases, stake pockets are provided in the rim or lip of the box but these are often inadequate and of course, it may be necessary to keep them free for their intended purpose.

The object of this invention is to provide a rack for use with a pick-up truck which will facilitate the safe transportation of loads, particularly long loads, and which may be installed with minimal alteration to the truck.

According to this invention, there is provided a rack for installation on a pick-up truck having a cab and a box, the rack comprising support means for carrying a load and extending at least partly up the height of the cab to elevate at least a portion of the load above the cab roof, and locating means to removably couple the rack to an upright panel forming a forward part of the box, the locating means being adapted to restrict movement of the rack relative to the box.

A preferred embodiment of the invention is described below, by way of example only, and with reference to the accompanying drawings, in which.

Figure 2:
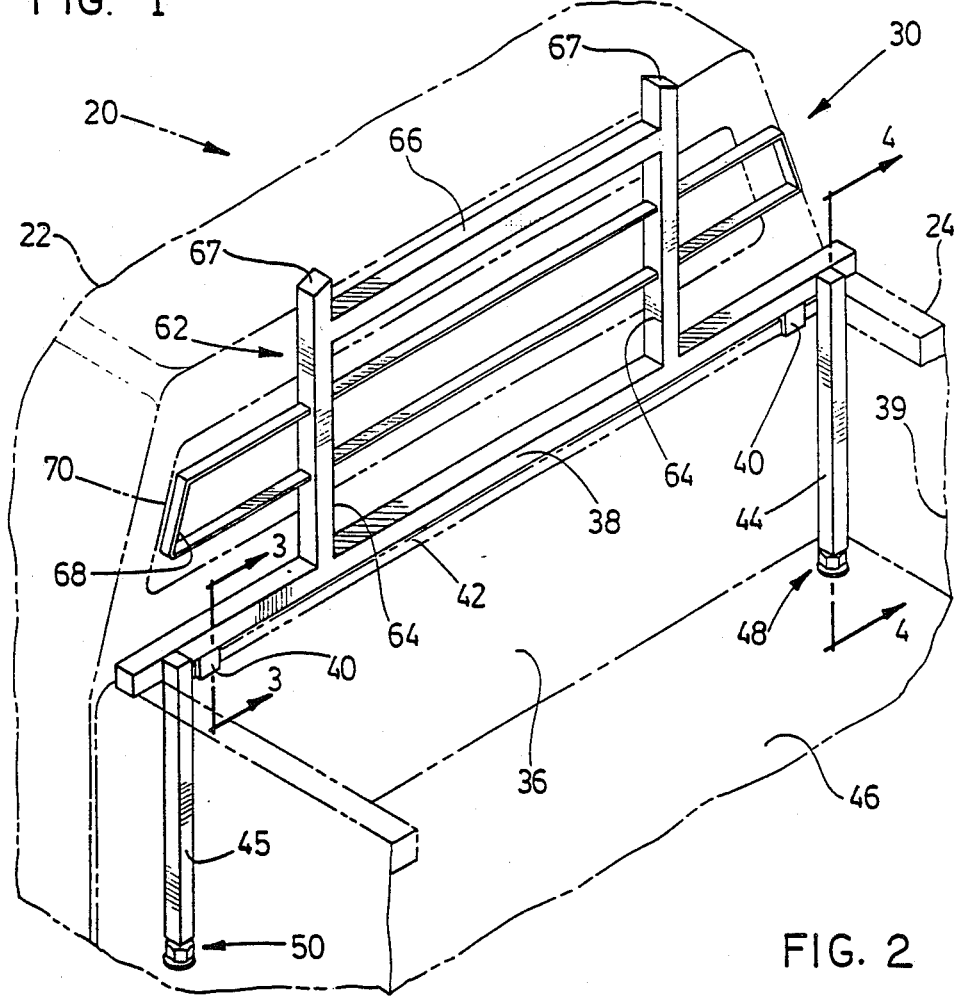
FIG. 2 is a perspective view of the rack according to the invention, looking from the rear of the box and toward the cab of the pick-up truck (shown in ghost outline)
Figures 3, 4:
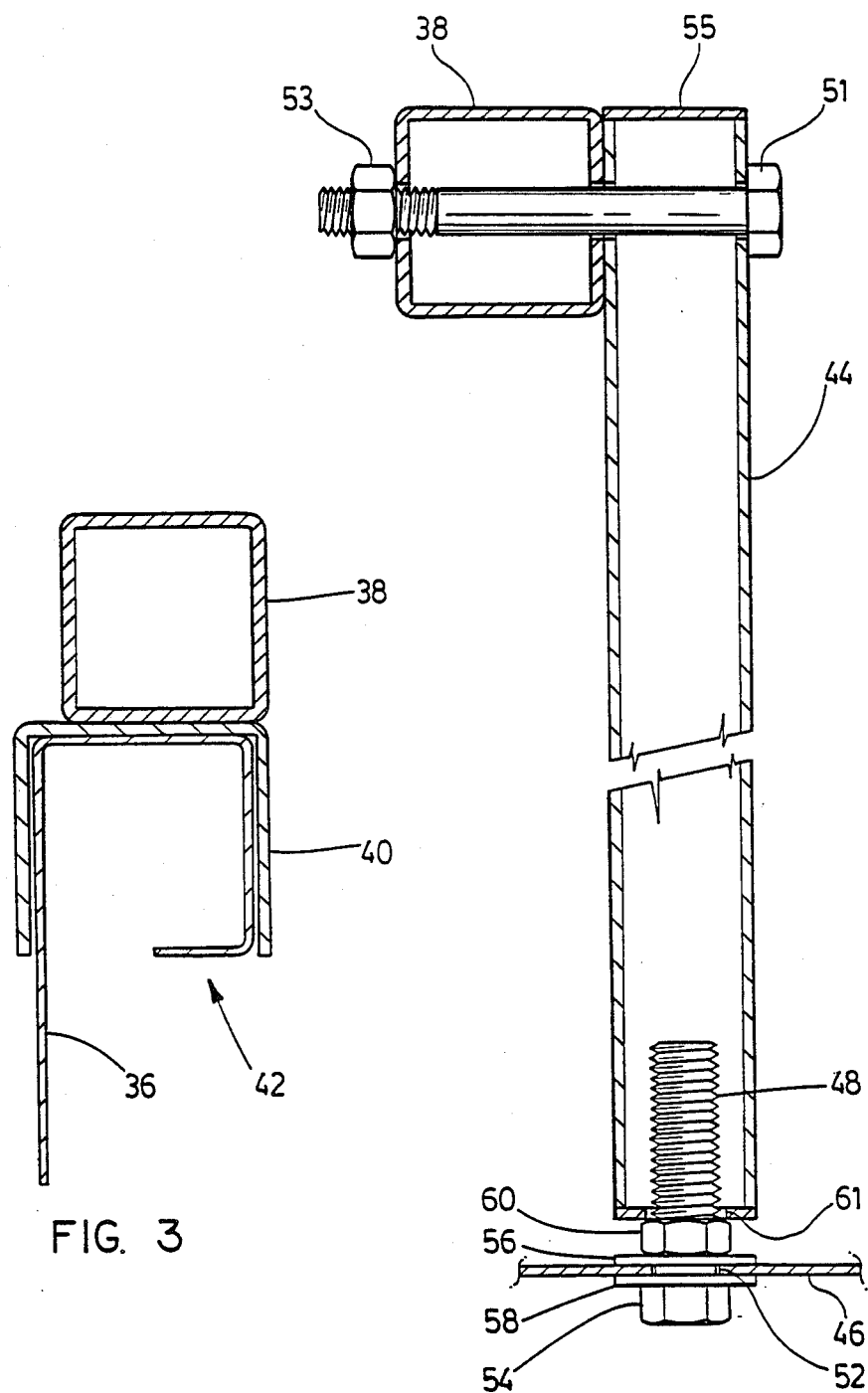

FIG. 3 is a cross-sectional view taken on line 3—of FIG. 2 and drawn to a larger scale, illustrating the connection between a lower truss forming part of the rack and a front panel forming part of the box; and FIG. 4 is a cross-sectional view taken on line 4-4 of FIG. 2 and drawn to a larger scale, illustrating the connection at the top between the truss and one of two legs forming part of the rack and the connection at the bottom between the leg and the floor of the box.

Figure 1:
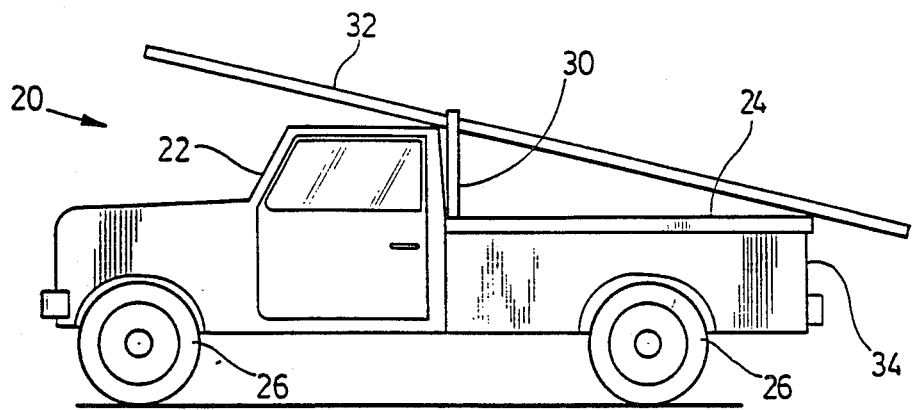
FIG. 1 is a schematic side view of a pick-up truck equipped with a rack according to the invention and carrying a long ladder.

A typical pick-up truck is indicated generally by numeral 20 in FIG. 1 and includes a cab 22 at the front and a box 24 at the rear, supported on road wheels 26.

A rack 30 according to the invention is attached to the box 24 behind the cab 22 and supports a long ladder 32 near a forward end above the cab roof, the other end of the ladder being supported by the tail gate 34 or rear panel of the box.

The rack 30 is more clearly illustrated in FIG. 2 which shows the truck 20 in ghost outline and the rack straddling the box 24 in an orientation which is transverse to the length of the box such that it is above a panel 36 forming a forward part of the box. The rack 30 includes a lower truss 38 of square steel tubing and having a length corresponding to the overall width of the box 24. A pair of inverted U-shaped brackets 40 (one of which is detailed in FIG. 3) depend from the lower truss 38 and are spaced from the ends of the truss inwardly of side panels 39 which form part of the box. The brackets 40 locate the lower truss on the top edge of the panel 36 which, as can be seen in FIG. 3, comprises sheet metal bent to form a rim 42 having a square cross-section.

A pair of legs 44, 45 also made of square steel tubing, depend from the lower truss 38 near the ends of the lower truss between the side panels 30 and the brackets 40. The legs 44, 45 reach a floor 46 forming part of the box 24 where they locate about respective anchors formed of bolts 48, 50. In FIG. 4, it will be seen that the lower truss 38 and the leg 44 are connected at substantially right angles to one another by a fitted bolt 51 traversing the leg 44 and the lower truss 38, the bolt 51 having a threaded outer end for receiving a securing nut 53 which, in this case, is positioned between the lower truss and the cab 22. Upon loosening of the nut 53, this arrangement permits the leg 44 to be pivoted on the bolt 51 into parallel relationship with the lower truss 38 for easy storage and shipping. An end cap 55 is welded on the top end of the hollow leg 44 to exclude precipitation and to trim the appearance of the rack 30.

The connection between the leg 44 and the floor 46 is also shown in FIG. 4. The bolt 48 is inserted through a hole 52 cut through the floor 46 with the head 54 lying below the floor and the threaded end extending above the floor (as drawn). Washers 56, 58 extend about the hole 52 around the bolt 48 with the floor 46 sandwiched in between and a nut 60 is threaded on the bolt 48 to secure it in position. An apertured locating shoulder 61 is welded on to the free end of the leg 44 and abuts the nut 60 with the threaded end of the bolt 48 received in the aperture and inside the leg 44.

An upright framework 62 is connected to the lower truss 38 by a pair of upwardly extending bars 64 made of square steel tubing and forming part of the framework 62. Near their upper end, the bars 64 are connected by an upper truss 66 substantially parallel to the lower truss 38 and spaced so as to extend at least partly up the height of the cab and to elevate at least a portion of the ladder 32 above the cab roof when the ladder is inclined and supported on the rack 30 and the tail gate 34. The top ends of the bars 64 are closed by welded end caps 67 in similar fashion to the leg 44. The framework 62 also includes a window guard 68 of flat bar lying between the lower and upper trusses 38, 66 and having the general shape of a trapezium. The parallel sides of the window guard 68 are orthogonal to the bars 64 and extend across the width of a rear window 70 forming part of the cab 22 with the bars lying in between. The other two sides of the window guard 68 are spaced from the edge of the cab 22 and are inclined so as to follow the contour of the cab for a pleasing aesthetic appearance.

Prior to installing the rack 30 on the pick-up truck 20, the leg 44 is pivoted into the operative orientation illustrated in FIG. 2, that is, at right angles to the lower truss 38, and the nut 53 is lightly tightened to maintain the relative configuration of the leg and the lower truss. The same procedure is repeated with the leg 45. It is understood that the bolts 48, 50 will have already been positioned on the floor 46 prior to positioning of the rack 30. The rack 30 is then lowered onto the box 24, with the brackets 40 receiving the rim 42 and simultaneously, the legs 44, 45 are lowered over the bolts 48, 50. The nut 53 and the corresponding nut on the leg 45 are given a final tightening and the rack is ready to use.

It will be understood that the weight of a load supported on the rack 30 is distributed on the entire length of the rim 42 and accordingly, the rim is unlikely to deform. Another feature of the rack is its stability, notwithstanding that it is easily removed from the truck. By locating about the rim 42 of the box, the brackets 40 restrict to and fro movement of the rack and side to side movement of the rack is restricted by engagement of the legs 44, 45 with the sides of the box. Any other movement having a horizontal component is further restricted by the location of the legs 44, 45 about the anchors or bolts 48, 50.

In use, any long load like the ladder 32 may be rested on the upper truss 66 and is preferably located between the bars 64 with one end extending over the roof of the cab 22. The ladder 32 is then secured with ropes tied onto the window guard 68.

Alternatively, a heavy load may be supported on the box floor 46 and secured to the framework 62 to prevent it from toppling over, in particular, a top heavy load such as a refrigerator, a barbeque, or a cement mixer.

In addition to anchoring tie ropes, the window guard 68 may conveniently be used to mount spot lights. Obviously, the window guard provides some protection to the window and any passengers from injury caused by a load being thrown toward the cab as may occur upon sudden deceleration of the truck. It will also be appreciated that the overall height of the truck fitted with the rack 30 will not be increased to any substantial extent with the result that the truck can be driven directly into low headroom parking areas without the inconvenience of having to dismantle the rack prior to entry.

Another attractive feature of the rack is that the legs can be folded parallel to the lower truss so as to decrease its width and conveniently, allow it to be stored on the box floor with its longitudinal axis parallel to the longer sides of the box.

It will be understood that several variations may be made to the above described embodiment of the invention. In particular, the configuration of the framework may vary considerably and will to some extent be dependent on aesthetic considerations determined by the shape of the cab. Furthermore, it will be understood that the junction between the lower truss and the legs may be made permanent, for example, by welding and that alternative means may be used to locate the legs on the cab floor.

I claim:

1. A rack for use in securing loads at the front of the box of a pick-up truck, the box having a forward upright panel terminating at a top edge and located behind the cab of the truck, the rack comprising:
    a longitudinal lower truss for horizontal location on the upright panel of the box and extending across the width of the truck;
    a longitudinal upper truss parallel to the lower truss and vertically spaced therefrom to support at least a portion of a load above the cab roof;
    a pair of spaced upstanding members connecting the trusses to one another, and inwardly spaced from the ends of the lower truss, the ends of the upper truss being contiguous with the upstanding members;
    load locating means extending upwardly from the upper truss and transversely spaced about the centerline of the truck so as to center a load supported on the upper truss;
    rack locating means coupled to the lower truss and adapted for engagement with the top edge of said panel to retain the rack longitudinally with reference to the length of the truck and to prevent movement transversely of the truck, the location means including anchor means adapted to position the rack to prevent movement of the upper truss longitudinally of the truck relative to the lower truss; and
    window guard means including anchoring means for attaching a load and comprising at least one elongate member having two ends and located between the lower and upper truss with the upstanding members inwardly spaced from the ends of said elongate member so that the window guard lies across a rear window forming part of the cab and protects the window and any passengers seated in the cab from a load thrust against the cab, said elongate member being made of flat bar having opposite narrow sides and opposite wide sides, the bar being oriented with said wide sides horizontal so as to minimize obstruction of the driver's view through the window.

2. A rack according to claim 1 in which the window guard means comprises two horizontally extending members vertically spaced between the lower and upper truss.

3. A rack for use in securing loads at the front of the box of a pick-up truck, the box having a forward upright panel terminating at a top edge and located behind the cab of the truck, the rack comprising:
    a longitudinal lower truss for horizontal location on the upright panel of the box and extending across the width of the truck;
    a longitudinal upper truss parallel to the lower truss and vertically spaced therefrom to support at least a portion of a load above the cab roof;
    a pair of spaced upstanding members connecting the trusses to one another, and inwardly spaced about the ends of the lower truss, the ends of the upper truss being contiguous with the upstanding members;
    load locating means extending upwardly from the upper truss and transversely spaced about the centerline of the truck so as to center a load supported on the upper truss;
    rack locating means coupled to the lower truss and including channel means adapted to receive a rim defined by the top edge of said panel and thereby retain the rack longitudinally with reference to the length of the truck, a pair of leg means positioned for location adjacent to side walls forming part of the box to thereby prevent movement transversely of the truck, and anchor means coupled to the floor for locating the legs and positioning the rack to thereby prevent movement of the upper truss longitudinally of the truck relative to the lower truss; and window guard means including anchoring means for attaching a load comprising at least one elongate member having two ends and located between the lower and upper truss with the upstanding members inwardly spaced from the ends of said elongate member so that the window guard lies across a rear window forming part of the cab and protects the window and any passengers seated in the cab from a load thrust against the cab, said elongate member being made of flat bar having opposite narrow sides and opposite wide sides, the bar being oriented with said wide sides horizontal so as to minimize obstruction of the driver's view through the window.

4. A rack according to claim 3 in which the window guard means comprises two horizontally extending members vertically spaced between the lower and upper truss.

* * * * *